United States Patent [19]

Gonzales et al.

[11] 4,414,886
[45] Nov. 15, 1983

[54] FRUIT SQUEEZER

[76] Inventors: Louis P. Gonzales, 21114 S. Pioneer Blvd. #201, Lakewood, Calif. 90715; Dennis M. Long, 1202 Le Gray Ave., Los Angeles, Calif. 90042

[21] Appl. No.: 97,558

[22] Filed: Nov. 26, 1979

[51] Int. Cl.³ .............................................. A23N 1/00
[52] U.S. Cl. ..................................... 99/495; 100/116; 100/135; 100/210
[58] Field of Search ................ 99/495, 501, 504, 505, 99/509–513; 100/94, 98 R, 104, 110, 116, 121, 125, 210, 130, 213, 133–135; D7/48, 49

[56] References Cited

U.S. PATENT DOCUMENTS

| 1,451,534 | 4/1923 | Choppa | 100/210 |
| 1,659,412 | 2/1928 | Sowers | 100/210 |
| 3,011,430 | 12/1961 | Bloomquist | 100/135 |

FOREIGN PATENT DOCUMENTS

| 143974 | 10/1951 | Australia | 99/513 |
| 399418 | 10/1933 | United Kingdom | 99/513 |

Primary Examiner—Timothy F. Simone
Attorney, Agent, or Firm—Erik M. Arnhem

[57] ABSTRACT

A fruit squeezer, comprising a container and a lid, rotatably mountable thereon, provided with an impacting block extending from the underside of the lid to the bottom of the container, and terminating in a pin-like projection, rotatably insertable in a centered aperture in the container bottom; vertically directed ribs extends outwardly from the interior wall of the container, coacting with the rotatable impacting block to press juice from a fruit placed there between; a cluster of openings surrounds the bottom aperture for the outflow of juice, then channeled through a spout mounted beneath and covering the outflow openings in the container bottom.

5 Claims, 5 Drawing Figures

FRUIT SQUEEZER

FIELD OF THE INVENTION

The invention refers to a fruit squeezer, particularly a lemon squeezer; the device is intended for use, at the dinner table, etc. by an individual who wants to measure a small amount of juice for his food. In contrast to known lemon squeezers, e.g., the open reamer, the invention comprises a closed container, within which squeezing means are accommodated for pressing juice from a lemon, and a spout for the direct outflow of its juice to be applied to food.

SUMMARY OF THE INVENTION

As indicated above, the invented squeezer consists of a lidded circular housing, preferably made of sturdy transparent plastic, which completely encloses the actual means for squeezing e.g., a lemon section placed therewithin, having, at its bottom, an outlet for the pressed out juice; in other words the device, according to the invention, is an applicator which produces fresh juice, which may be applied directly to the food. The device is operated manually and the user may regulate the amount of juice that he wants to apply. The unused part of the lemon section, remaining in the container, keeps its juiciness rather well and much better than if it were placed outside the container. Furthermore, the invented device prevents, when carrying out the squeezing process, splattering of juice, seeds or the soiling of one's hands, being inherent in most conventional manual squeezers, such as the reamer.

Since the squeezer, according to the invention, is primarily intended for one individual's use only, the device is so designed, that several units of same may be stacked on top of and easily from one another, on, e.g. the dinner table.

The construction or components of the invented squeezer lends itself for manufacture by an injection molding process, using e.g., clear or colored styrene. The device is operated by manually rotating the lid of the squeezer, which is provided with an impacting member forcing a lemon wedge against frictionalizing vertical elements projecting from the interior circular walls of the container, and causing juice to be pressed from the lemon, then flowing through an outlet at the bottom of the container.

It is, thus the principal object of the invention to provide a manual fruit squeezer which presses the juice for direct application to food.

It is a further object of the invention to provide a squeezer, which completely encloses the squeezed fruit, preventing splattering of juice or pulp, or soiling of one's hands.

It is still a further object of the invention to provide a squeezer which is inexpensive to manufacture, and easy to operate.

Other objects and purposes of the invention will appear from the following detailed description.

DESCRIPTION OF THE PREFERRED EMBODIMENT OF THE INVENTION

Figure 1:
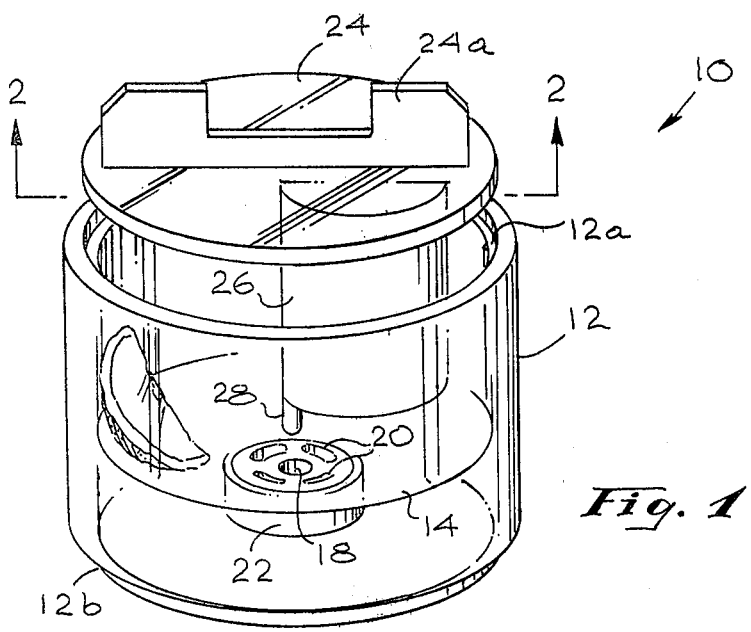
FIG. 1 is an exploded view of a transparent fruit squeezer, according to the invention.

In the drawings like reference characters designate similar parts in the illustrated views.

Figure 2:
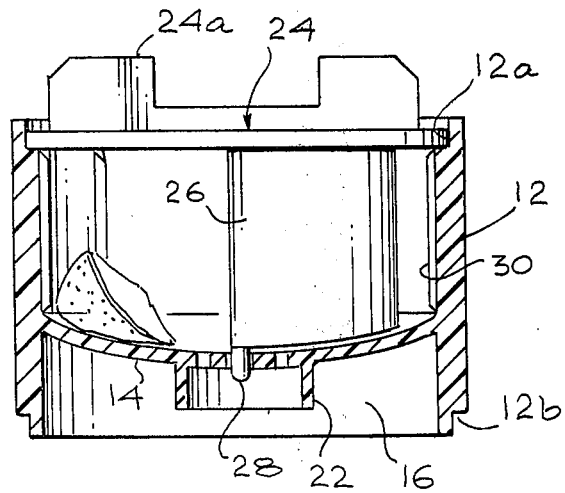
FIG. 2 is a sectional view of the squeezer taken on line 2—2 of FIG. 1.
Figure 4:
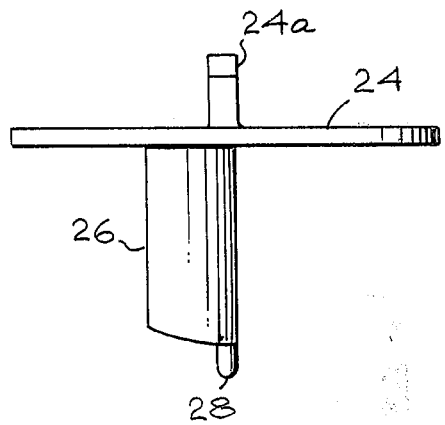
FIG. 4 is a side view of a lid portion of the container with a fruit impacting member extending therefrom.
Figure 3:
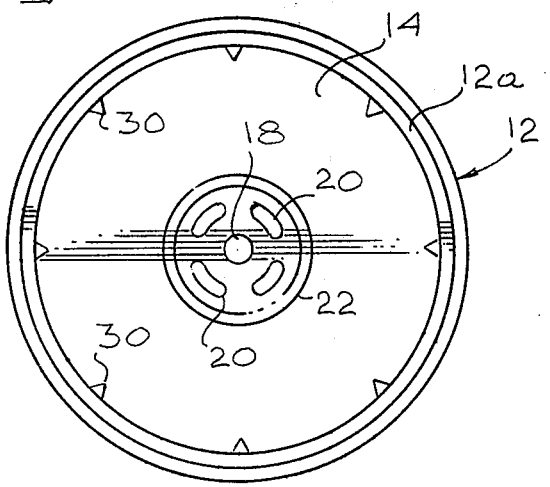
FIG. 3 is a top view of the squeezer container.

Referring now in detail to FIG. 1 of the drawings, numeral 10 designates the complete squeezer device, according to the invention. A receptacle, e.g., container 12, preferably circular in shape is made of clear plastic material, such as styrene. The bottom 14 of container 12 is dished and mounted off set, at approximately ½ inch from the lower edge of the container (as also shown in FIG. 2), so as to form a hollow open space (indicated by numeral 16) beneath bottom 14.

The center of bottom 14 is apertured, that is there is provided a circular hole 18, encircled by a number of e.g., four oblong apertures 20, through which the juice from the lemon section (indicated schematically in FIG. 1) flow, when subjected to a squeezing process in container 12; outlet means, e.g., a collar shaped spout 22 (FIG. 2) is mounted to (or extends integrally from) the underside of bottom 14 of container 12 encompassing the cluster of apertures (18, 20) in bottom 14, and funneling the juice by the aid of dished bottom 14 through apertures 20 for application onto the food.

Figure 5:
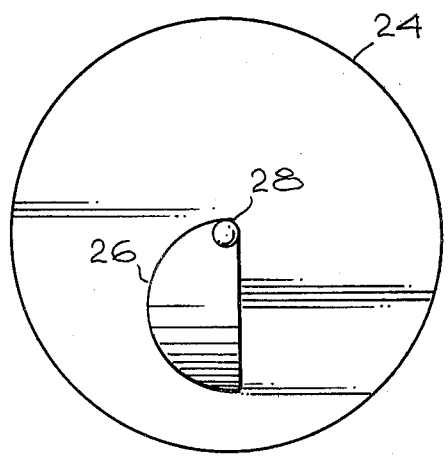
FIG. 5 is a view in elevation of the container lid.

The upper edge surface of container 12 is recessed, forming an endless circular shoulder 12a, the purposes of which will be explained in the following. Impacting means includes, e.g., a closure or circular lid 24, and a semi-circular block 26 (FIG. 5), one end of which is mounted securely to (or more integral with) the underside of lid 24, extending from the center of the lid over a distance short of its radius, and downwardly therefrom. Lid 24 consists of a circular disk, provided with a handle 24a, extending upwardly perpendicular from along a portion of the diameter of the lid, for manual manipulation of same (FIG. 1). The center portion of handle 24a has a cut-out, the purpose of which will also be explained further on. When lid 24 is mounted rotatably on shoulder 12a of container 12, block 26 will extend within the container, abutting the surface of its bottom 14.

Projecting means, e.g., a pin-like projection 28 is mounted periphereally at the lower end of the unmounted surface of block 26, extending, perpendicularly downward and rotatably into center aperture 18 above spout 22, when lid 24 is placed over container 12. When applying the lid 24 to container 12, projection 28 will automatically insert aperture 18, since both of them are located along the exact center line of the container 12. Due to the insertion of projection 28 in aperture 18, lid 24 may be rotated in a smooth and stable manner.

A plurality of frictionalizing means, e.g., vertically directed elongated ribs 30 are mounted, preferably spaced uniformly relative to one another, along (or is made integrally with) the interior wall surface of container 12. The primary purpose of these ribs 30 is to interact with block 26, to frictionally prevent the lemon wedge, placed within the squeezer, from sliding along the circular interior wall of the container, when the impacting block is manually rotated.

The surface of the lower edge of container 12 is also recessed forming a circular shoulder 12b, however, directed inversely relative shoulder 12a, for mounting on top of another container. As shown in FIG. 2, the upper edge of container 12 protrudes above the surface of lid 24; thus, when another container (12) is stacked on container 12, its shoulder 12b will nestle itself snugly and lie against the top and inner surfaces of shoulder 12a, and a peripheral surface portion of lid 24 (adjacent 24a, which does not extend all the way to the edge of lid 24). In this manner, one would be able to securely stack a number of containers (12) on top of one another. When the containers are also stacked the spout 22 (extending from off-set bottom 14 of container 12) will fit within the center cut-out of lid handle 24a of a container situated underneath, thus contributing to the stability of the stack of containers; handle 24a will then be accommodated within space 16 beneath bottom 14.

The squeezer, according to the invention, operates as follows:

A lemon section (indicated schematically in FIGS. 1 and 2) is placed at the bottom of container 12. Lid 24, placed on the container, is then being manually rotated with the flat surface side of block 26 impacting the lemon and pressing same against the ribs 30, causing partial or complete squeezing out of the juice, which drops on the dished bottom 14 of the container and immediately flows out through apertures 20. The dimensions of apertures 20 are so chosen that only pure juice can pass through same, leaving seeds, rind and pulp of the fruit on the bottom of the container, for subsequent removal therefrom.

The preferred dimensions of the squeezer are as follows:
Height of container 12 (approximately) 2 inches.
Diameter of container (approximately) 3 inches.
Diameter of lid (24) (approximately) 3 inches.
Diameter of block (26) (approximately) 1¼ inches.
Height of block (approximately) 1 inch.
Radius of block (approximately) ⅝ inch.
Diameter of spout (22) (approximately) ¾ inch.
Length of ribs (30) (approximately) 1¼ inches.

While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended claims.

We claim:
1. A fruit squeezer, comprising:
(a) A circularly shaped container, including a dished bottom, arranged off-set from the lower edge of the wall of the container and having a center opening, surrounded by a plurality of outlet apertures for the juice squeezed from the fruit, the upper and lower edges of the wall of the container being recessed to form inversely directed shoulders, capable of nestling within the lower and upper edges, respectively of additional containers for stacking purposes;
(b) A collar-shaped spout extending downwardly from the underside of and encompasses the apertures in the bottom of the container;
(c) A plurality of elongated vertically directed ribs extending from the interior wall of the container;
(d) A circularly shaped lid, rotatably mounted in the shoulder of the upper edge of the container wall, including a handle having a centered cut-out, extending upwardly from and along a portion of the diameter of the lid, a portion of the shoulder of the upper container edge protrudes above the surface of the lid so that the shoulder of the lower edge of another container may be stacked thereon, abutting the protruding upper container edge and the surface of the lid, with its spout fitting within the cut-out of the handle of the underlying container;
(e) A semi-circular block extending, from the center of the underside and along a portion of the radius of the lid, vertically downward, abutting the bottom of the container, and terminates in a pin-shaped projection, being rotatably insertable in the center opening of the bottom of the container, said semi-circular block will, when the lid of the container is rotated thereon, co-act with the ribs, extending from the container wall, causing juice to be pressed from a fruit placed within the container.

2. A fruit squeezer, comprising:
(a) A circularly shaped container, having an apertured bottom, the interior wall surface of which is provided with an elongated vertically extending rib;
(b) impacting means, including a circularly shaped lid mounted turnable on the container and a semi-circular block extending, from the center of and along the radius of the lid, vertically downward within the container and abutting the bottom of the container for co-operating frictionally with the elongated rib to press juice from a fruit placed there between, the lid includes a handle having a centered cut-out, extending upwardly from and along a portion of the diameter of the lid.

3. A fruit squeezer, according to claim 2, wherein the bottom of the container is dished, arranged off-set from the lower edge of the container wall and has a center opening, surrounded by a plurality of outlet apertures and a spout, extending downwardly from the underside of and encompassing the outlet openings, through which the juice passes.

4. A fruit squeezer, according to claim 3, wherein the semi-circular block terminates in a pin-shaped projection which is rotatably insertable in the center opening of the container bottom to stabilize the rotary operation of the fruit squeezer.

5. A fruit squeezer, according to claim 3, wherein the upper and lower edges of the wall of the container are recessed to respectively form, inversely directed shoulders, capable of nestling within the lower and upper edges, respectively of additional containers, the spout of the container being so dimensioned that it may be accommodated within the cut-out of the handle of another container, for stacking on top of one another.

* * * * *